United States Patent [19]
Sid-Ahmed

[11] Patent Number: 5,668,602
[45] Date of Patent: Sep. 16, 1997

[54] REAL-TIME TELEVISION IMAGE PIXEL MULTIPLICATION METHODS AND APPARATUS

[76] Inventor: Maher Ahmed Sid-Ahmed, 12703 Riverside Dr. E., Tecumseh Ontario, Canada, N8N 1A7

[21] Appl. No.: 512,960

[22] Filed: Aug. 9, 1995

Related U.S. Application Data

[63] Continuation of Ser. No. 992,798, Dec. 18, 1992, abandoned.

[51] Int. Cl.[6] .................................................. H04N 7/01
[52] U.S. Cl. ........................................ 348/448; 348/458
[58] Field of Search ................................ 348/448, 458, 348/459, 443, 446; H04N 7/01

[56] References Cited

U.S. PATENT DOCUMENTS

| | | |
|---|---|---|
| 4,282,546 | 8/1981 | Reitmeier ............................ 358/22 |
| 4,322,750 | 3/1982 | Lord et al. ........................... 358/140 |
| 4,364,090 | 12/1982 | Wenland ............................. 358/140 |
| 4,435,728 | 3/1984 | Raven et al. ......................... 358/140 |
| 4,603,351 | 7/1986 | Vreeswijk et al. .................... 358/140 |
| 4,706,113 | 11/1987 | Ito et al. ............................. 358/37 |
| 4,868,656 | 9/1989 | Geiger et al. ........................ 358/140 |

Primary Examiner—Glenton B. Burgess
Attorney, Agent, or Firm—Gifford, Krass, Groh, Sprinkle, Patmore, Anderson & Citkowski

[57] ABSTRACT

Circuitry and methods multiply the number of pixels in a television image without the need for changes in current transmission standards. One memory array or storage buffer is used to store one image, while data is being read from another memory or array storage buffer. The role of the two memory arrays changes with every incoming image, the memory array that was in the read mode is switched to the write mode, and vice-versa. The image read is interpolated through pixel replication in two-dimensions, followed by a square symmetrical two-dimensional low-pass filter, which provides interpolation based on the Sampling Theorem. This may be a two-dimensional (2-D) circularly-symmetrical high-pass filter for image enhancement. Interpolation may alternatively be carried out through a one-dimensional (1-D) filter, or through the Discrete Cosine transform. A description of a circuit realizing a 2-D infinite impulse response filter and the filter coefficients for a square symmetrical low-pass filter having near-linear phase is provided. Circuits for addressing the two memory arrays are also described for displaying video images through either progressive or interlaced scanning.

8 Claims, 18 Drawing Sheets

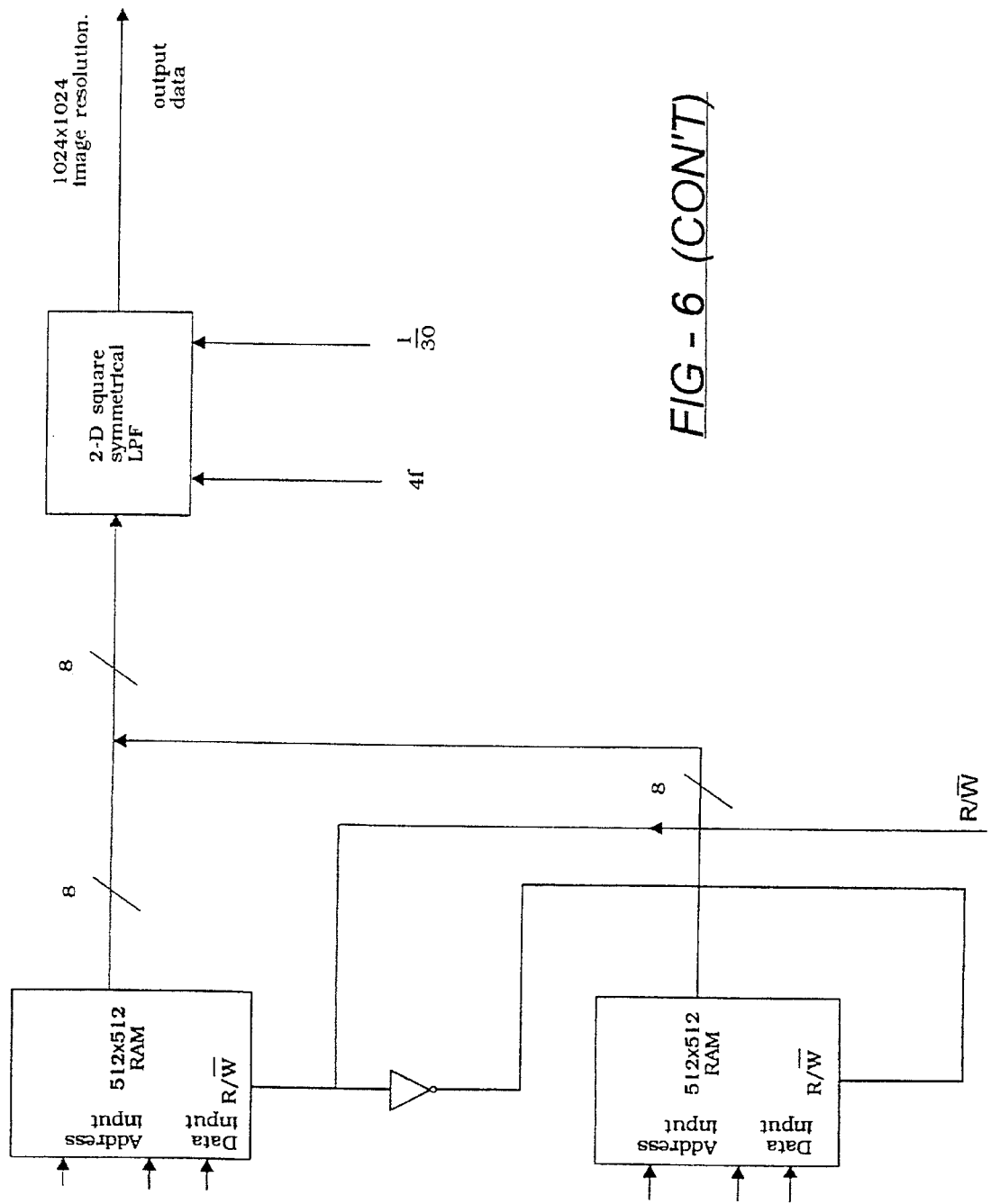
FIG-6 (CON'T)

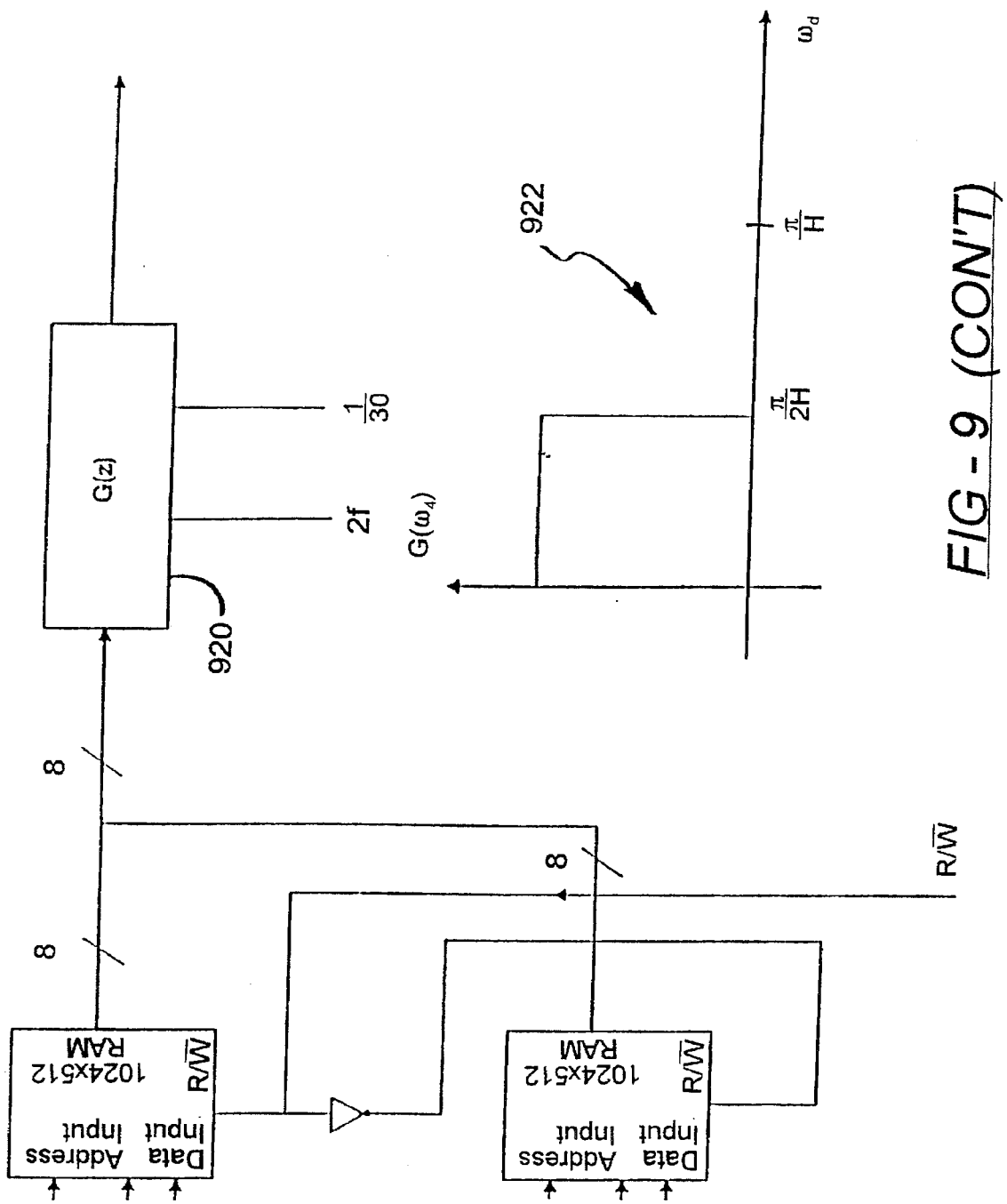
FIG-9 (CON'T)

REAL-TIME TELEVISION IMAGE PIXEL MULTIPLICATION METHODS AND APPARATUS

This is a continuation of application Ser. No. 07/992,798 filed on Dec. 18, 1992, abandoned.

FIELD OF THE INVENTION

The present invention relates generally to improved definition television and, in particular, to circuitry and methods whereby the number of pixels in a television image may be expanded to provide a high definition picture using current transmission standards.

There is much discussion concerning the eventuality of improved resolution television, including enchanced definition television (EDTV), high definition television (HDTV), or, in FCC parlance, "ATV", which stands for advanced television. Regardless of the label, the FCC has stated that broadcasters must tentatively remain within the 6 Mhz broadcast range now allocated for television, including existing NTSC services for the foreseeable future and during any transition period. Thus, a serious problem facing HDTV developers is downward compatibility with existing television receivers currently in use by consumers. At least one system developed for HDTV, the multiple sub-nyquist encoding or MUSE system developed in Japan, exceeds the 6 Mhz standard NTSC system, and therefore has not been approved by the FCC for terrestrial broadcasting.

The International Radio Consultive Committee (CCIR) recommends the following for HDTV: 1125 lines/frame; 1035 active lines per frame; 2:1 interlace; a 16:9 aspect ratio; and a 33.750 Khz line frequency. These parameters are similar to those established by Canadian-Japanese interests. Many European countries, on the other hand, wish to move away from interlaced scanning to progressive scanning, and remain at 50 frames/sec. The CCIR has recommended the following in such cases: 1152 active scanning lines; a 50 Hz field rate; progressive scanning; and a 16:9 aspect ratio A survey of proposed HDTV systems may be found in a paper by R Hopkins, "Advanced Television Systems", IEEE Transaction on Consumer Electronics, Vol. 34, No. 1, February 1988.

Were it possible to design a television receiver which performs as well as an HDTV set under the present broadcasting standards, this would effectively achieve the same goal as that of such enhanced definition approaches without upsetting the transmission system or consumers. One purpose of the present invention is to provide circuitry and methods for multiplying the number of raster lines in a video signal in real time, in accordance with the present FCC broadcast range, resulting in a television image of a quality rivalling that of an HDTV image. The hardware and techniques are also applicable to selective zooming of a TV image at the real-time frame rate.

SUMMARY OF THE INVENTION

The present invention provides electronic circuit designs and methods for multiplying the number of pixels in an incoming digitized video image in real time, including a video image associated with television broadcasting. Specifically, the system is capable of expanding the pixels associated with a standard 6-MHz TV signal into a format compatible with enhanced and high-definition television (HDTV) standards, though the invention is not limited to such applications and may be used for selective zooming of a portion of an image or other uses which may benefit from resolution enhancement.

The method aspect of the invention includes the steps of receiving pixels associated with an incoming digitized video image, replicating each pixel, interpolating the replicated pixels using low-pass filtering in two dimensions. The filtered pixels are then converted into analog form for display on a monitor capable of presenting the enhanced image. The step of interpolating the replicated pixels includes performing a numerical transformation followed by an inverse of the transformation, including such transforms as the fast Fourier transform and the discrete cosine transform.

To achieve a real-time transformation, the step of replicating each pixel of an incoming digitized video image includes:

providing two read/write memories to receive data representative of alternating fields of an incoming digitized video image;

allocating a plurality of storage locations in each read/write memory for each pixel associated with each field;

writing data representative of a particular pixel into one of the storage locations allocated for that pixel; and writing a predetermined value into all of the other storage locations associated with a particular pixel.

The apparatus aspect of the invention includes two read/write memories in communication with a common output bus and write-mode circuitry operative to enable the memories so that each is written with data representative of an alternating field of the image. Interpolation circuitry is operative to expand the number of pixels represented by each field of the image within the memories, followed by low-pass symmetrical digital filtering in two dimensions. A digital-to-analog converter is them employed to convert the digitally filtered, expanded pixels into analog form for subsequent display.

BRIEF DESCRIPTION OF DRAWINGS.

FIG. 11b is a processing element of the filter of FIG. 11a;

DESCRIPTION OF THE PREFERRED EMBODIMENT

Real-time 2-D filtering lends itself quite naturally to the concept of enhanced definition televisions (EDTV). The present invention effectively doubles the number of lines at the receiving end without changing the transmission standard, providing television sets having better quality pictures without the unnecessary expense of moving towards any of the HDTV standards.

It is known that the spectrum of an image decreases rapidly with increasing frequency. This property and the Whittaker-Shannon Sampling Theorem may be used to increase the resolution of an image. The procedure is as follows:

1. Obtain the Fast Fourier Transform, FFT, of a given digitized image of size N×N picture elements (pixels), i.e., $$I(k_1,k_2)=FFT\{i(n_1,n_2)(-1)^{n_1+n_2}\}$$

where $i(n_1,n_2)$=the intensity value of the image at location $(n_1,n_2)$ relative to the upper-left corner of the image. The factor $(-1)^{n_1+n_2}$ forces the frequency spectrum to have its origin at the center of the two-dimensional FFT array.

Figure 1:
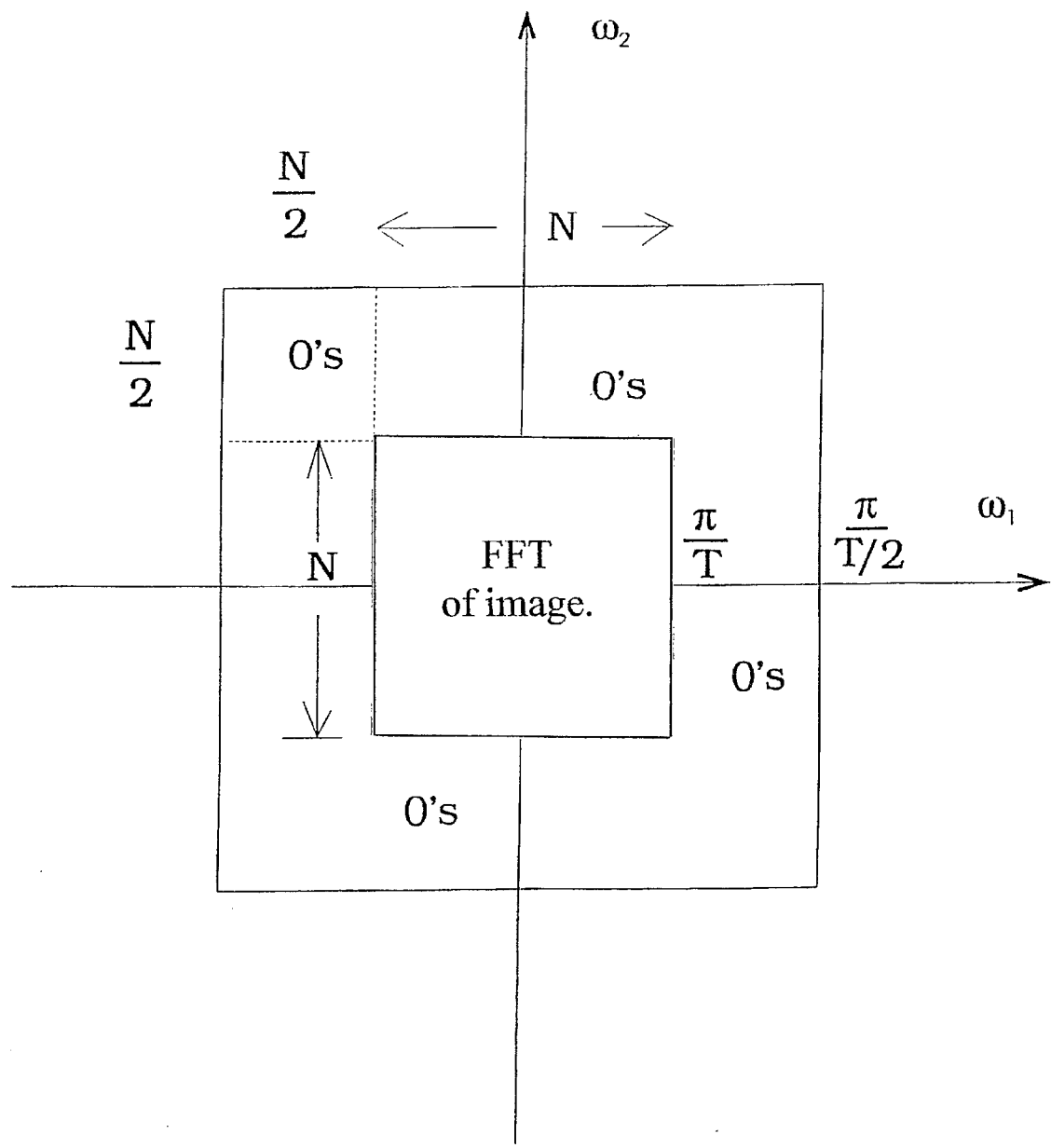
FIG. 1 illustrates the step of appending zeros to the 2-D frequency spectrum of an image.

2. Append zeros to the FFT as shown in FIG. 1 to increase its size to 2N×2N. This is equivalent to reducing the sampling period by two as shown in FIG. 1.

3. Obtain the inverse FFT of the 'expanded' frequency transform. The result is the original image with double the amount of resolution.

In this invention a spatial interpretation of the above approach is utilized in a circuit designed to double the image resolution in real-time. The direct interpretation in the spatial domain of the above approach includes replication, followed by two-dimensional (2-D) filtering. Other interpretations include oversampling along a horizontal line and a one-dimensional (1-D) filter, or usage of the Discrete Cosine transform.

Figure 2A:
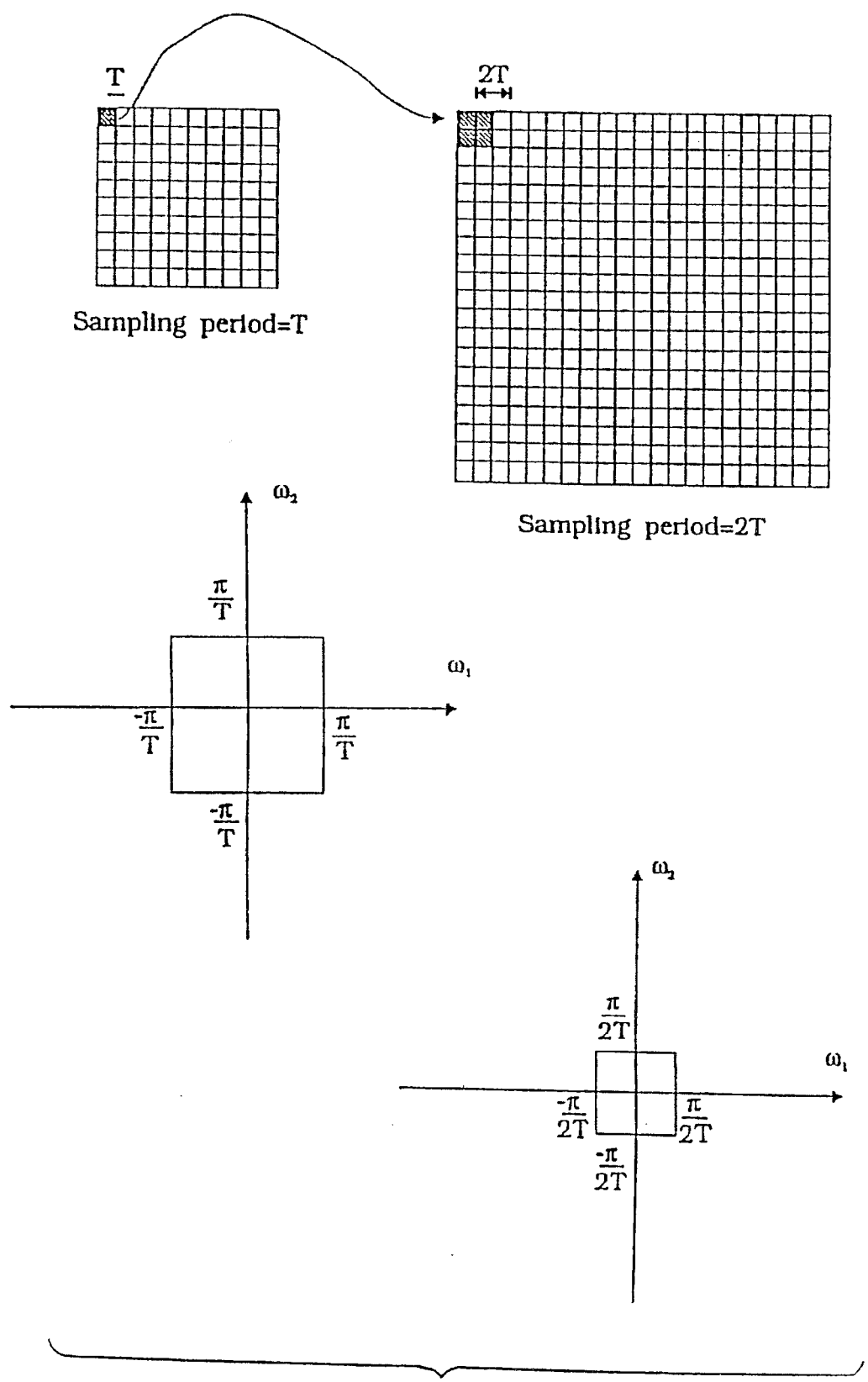
FIG. 2a shows an image enlarged by replication of individual pixels.

The procedure for doubling the image resolution can be explained as follows with reference to FIG. 2a.

1. Double the image resolution by horizontal replication of pixels, followed by replication of horizontal lines, i.e. each pixel 210 of the image 200 is copied into two consecutive horizontal locations on a memory array 200, and each horizontal line is replicated. This has the effect of doubling the horizontal and vertical sampling periods, $T_H$ and $T_V$ respectively, to twice their original values. That is, if $T_H=T_V=T$, then the new image 220 would have a sampling period of 2T along both directions. This step is equivalent to using a 2×2 interpolation function implemented as a finite impulse response (FIR) filter given by:

$$Y(z_1,z_2)=1+z_1^{-1}+z_2^{-1}z_1^{-1}z_2^{-1}$$

on an a stored image in memory whose pixels are stored at alternate locations along each horizontal line and at alternate lines in the vertical direction with the remaining locations being set to zero.

In the frequency domain, the higher resolution image obtained through replication would have a frequency spectrum that is described in the square region given by:

$$\left\{-\frac{\pi}{2T} \leq \omega_1 \leq \frac{\pi}{2T}\right\} \cup \left\{-\frac{\pi}{2T} \leq \omega_2 \leq \frac{\pi}{2T}\right\}$$

This spectrum, as is already know, is two dimensional periodic.

Figure 2B:
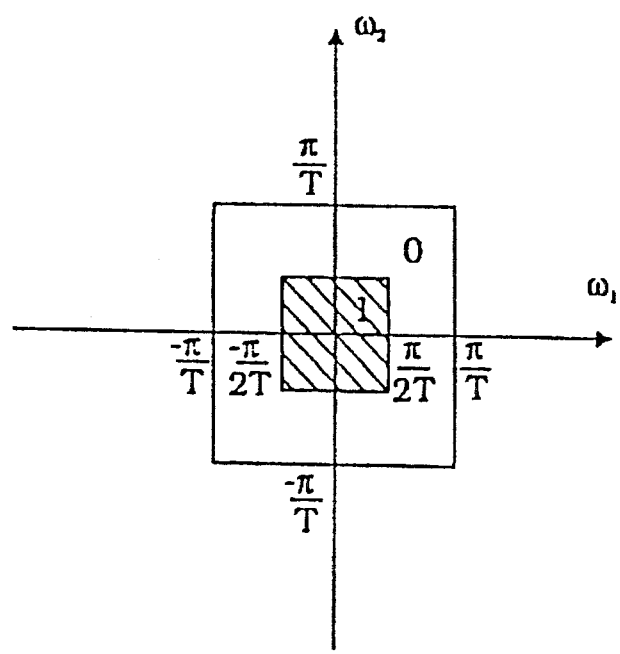
FIG. 2b illustrates the function of an interpolation filter.
Figure 2B:
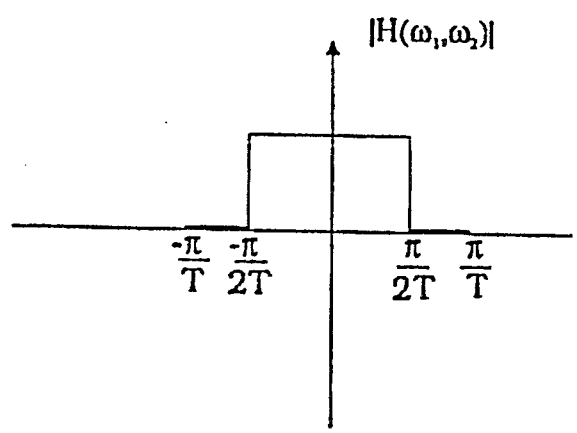

2. The next step is to pass the higher resolution image through a low-pass filter having the magnitude-frequency specification, as shown in FIG. 2b. This would be equivalent to adding zeros to the frequency spectrum as was done in the Fourier transform interpolation approach.

The result is an image with double the resolution similar to the one obtained from the FFT approach.

Figure 3:
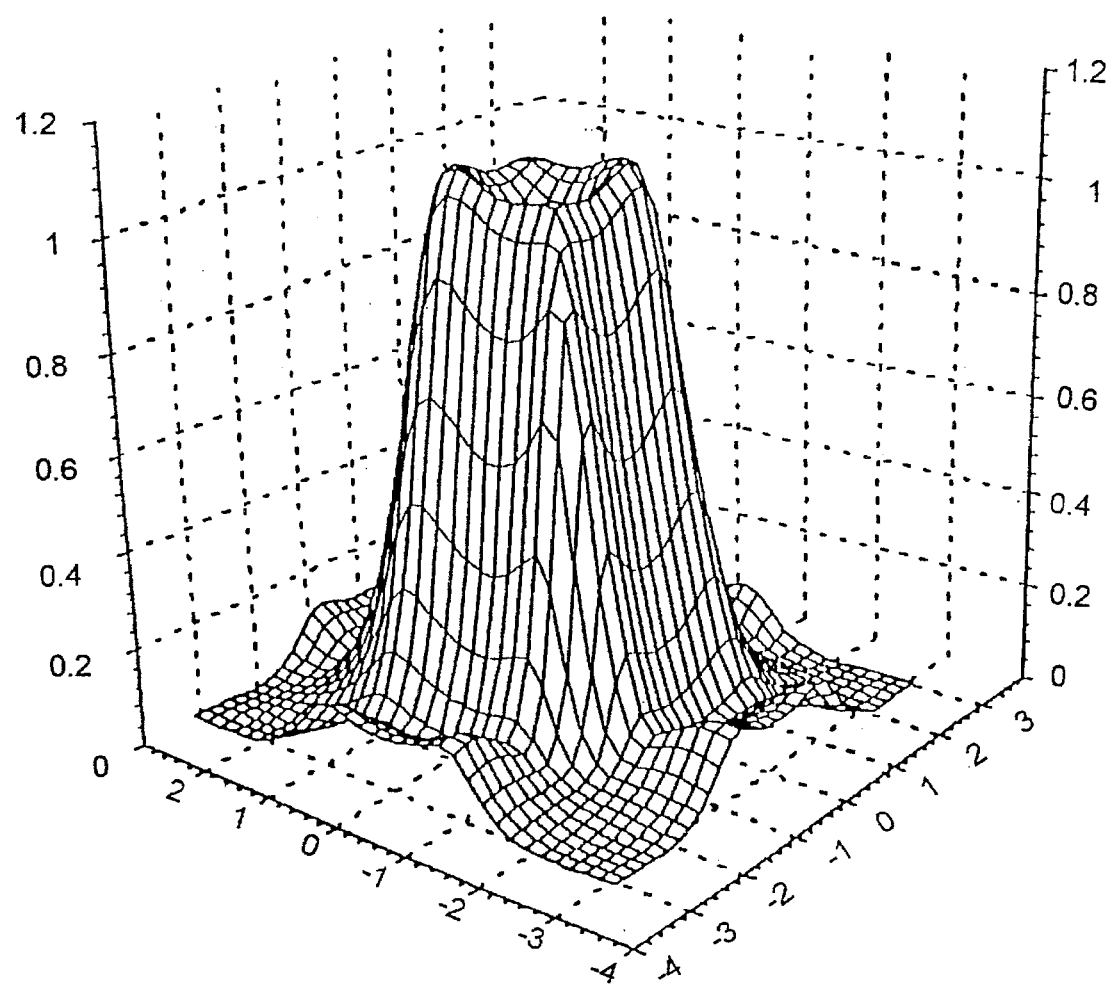
FIG. 3 is a graph showing the frequence-response characteristics of a 2×2 interpolation filter.

The above steps call for a square response type low-pass filter. Two 1-D IIR filters may be used with one of the 1-D filters being a function of $z_1$ and the other a function of $z_2$. Alternatively, a 2×2 low-pass infinite impulse response, IIR, filter may be used given by:

$$H(z_1,z_2)=\frac{\sum_{i=0}^{2}\sum_{j=0}^{2}a_{ij}z_1^{-i}z_2^{-j}}{\sum_{i=0}^{2}\sum_{j=0}^{2}b_{ij}z_1^{-i}z_2^{-j}}$$

and whose coefficients are given by Table I, and response given by FIG. 3. The filter also possesses near linear phase characteristics amenable to video processing.

Figure 4:
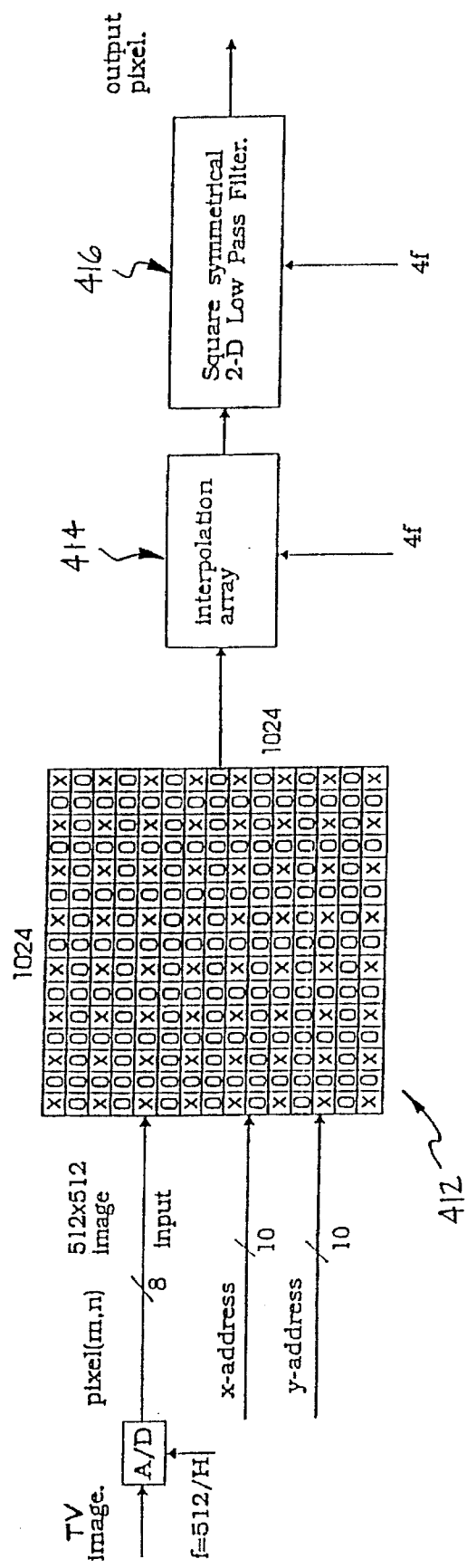
FIG. 4 shows a direct hardware implementation of the approach of FIG. 2 for doubling image resolution.

To apply the above approach for real-time implementation requires some novel circuit design techniques the method can be described by the block diagram shown in FIG. 4, as follows.

TABLE I

Coefficients of filter having the response shown in FIG. 1.

| i,j | $a_{ij}$ | $b_{ij}$ |
|-----|----------|----------|
| 0,0 | 0.100672 | 1.000000 |
| 0,1 | 0.084601 | -0.628831 |
| 0,2 | 0.046073 | 0.402671 |
| 1,0 | 0.084601 | -0.628844 |
| 1,1 | 0.086782 | 0.577022 |
| 1,2 | 0.058304 | -0.346921 |
| 2,0 | 0.046072 | 0.402674 |
| 2,1 | 0.058302 | -0.346920 |
| 2,0 | 0.050166 | 0.221563 |

1. A digitized form of the image (for example 512×512 pixels) is written in Read/Write (R/W) memory 412 at alternate locations along any given row, and on alternate rows (at the locations marked 'x' on the diagram). The rest of the locations have zeros.

2. The image is read-out and passed through a linear interpolation array 414, realized as an FIR filter, to provide double the image resolution. That is, a 1024× 1024 image is formed.

3. The output of the interpolation array is passed to the square symmetrical low-pass filter 416 to provide a higher resolution image on the basis of the Sampling theorem.

4. The image is then transformed into analog form and displayed on a 1024×1024 screen.

Note that the image should be read-out at four times the rate at which it was written in memory. This is due to the fact that the higher resolution image has 4 times the number of pixels. In doing so the read and write cycles of the image are equal.

Figure 5:
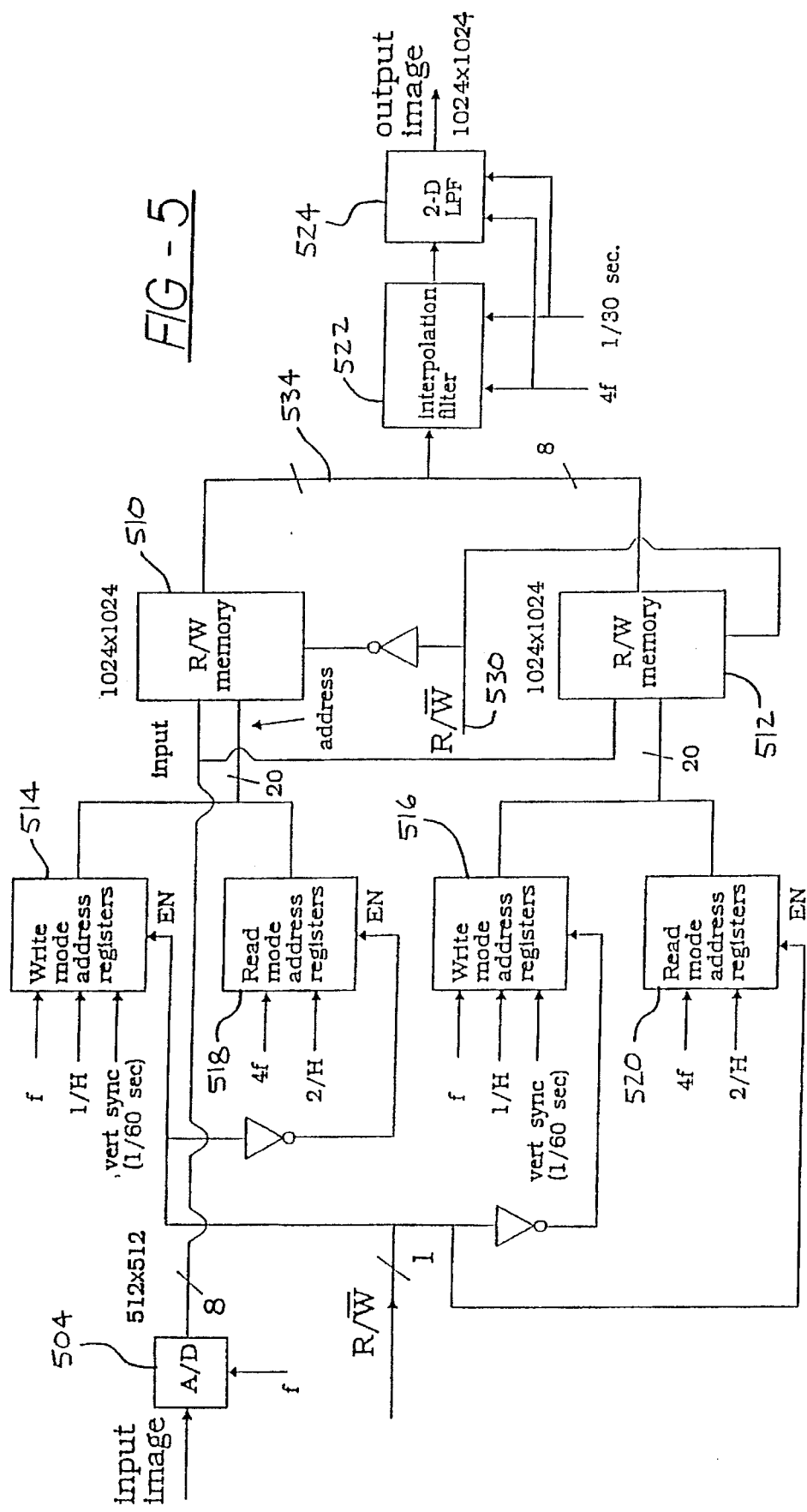
FIG. 5 is a block diagram of a circuit for real-time interpolation using the concept of FIG. 4.

This approach is suitable for non real-time applications. It is capable of processing one image at a time, and not a stream of images arriving at the rate of 30 frames/sec. because the same memory, be and written at the same time. One solution to this is to use two read-write memory arrays or memory buffers 510 and 512 as shown in FIG. 5. The write mode address registers 514 and 516 handle interlaced scanning and write at the appropriate positions in the R/W memory in accordance with FIG. 4. The read mode address registers 518 and 520 read the 1 MByte memory array at four times the pixel rate it was written at. The interpolation and low-pass 2-D filters operate at four times the horizontal sampling frequency f, where f=512/H, and H is the horizontal line delay of the television video signal. The output image is 1024×1024, with a new image every 1/30th of a second. The arrangement in FIG. 5 is such that while the reading of one image is carried-out from one memory array, writing of the next image is carried-out to the other memory array, and therefore no images are lost in the process. The designation f in FIG. 5 stands for the sampling frequency along a horizontal line and 1/H stands for the horizontal line frequency. These are related for an image of width=512 pixels by:

$$f = \frac{512}{H}$$

Continuing the reference to FIG. 5, the raster scanned image is converted to digital form through the A/D converter 504. The R/$\overline{W}$ signal 530 is a clock signal with a period equal to two complete frames, i.e. 1/30+1/30=1/15 sec. It is 'high' for 1/30 sec and 'low' for the next 1/30 sec. When R/$\overline{W}$ is high, the upper R/W, memory array 510 in the diagram will be in the write mode, its output data bus disabled (floating), and the lower memory array 512 will be in the read mode, its output data bus enabled. Both output busses are connected to a common bus 534, feeding the interpolation filter 522. The incoming image is written to the write enabled memory at the sampling frequencies f and 1/H. The previous image, which would have been stored in the lower memory array (the read enabled memory), is read-out to the interpolation filter 522 at a frequency of 4 f along the x-direction (along a row) and 2/H along the y-direction (line frequency).

Figure 6:
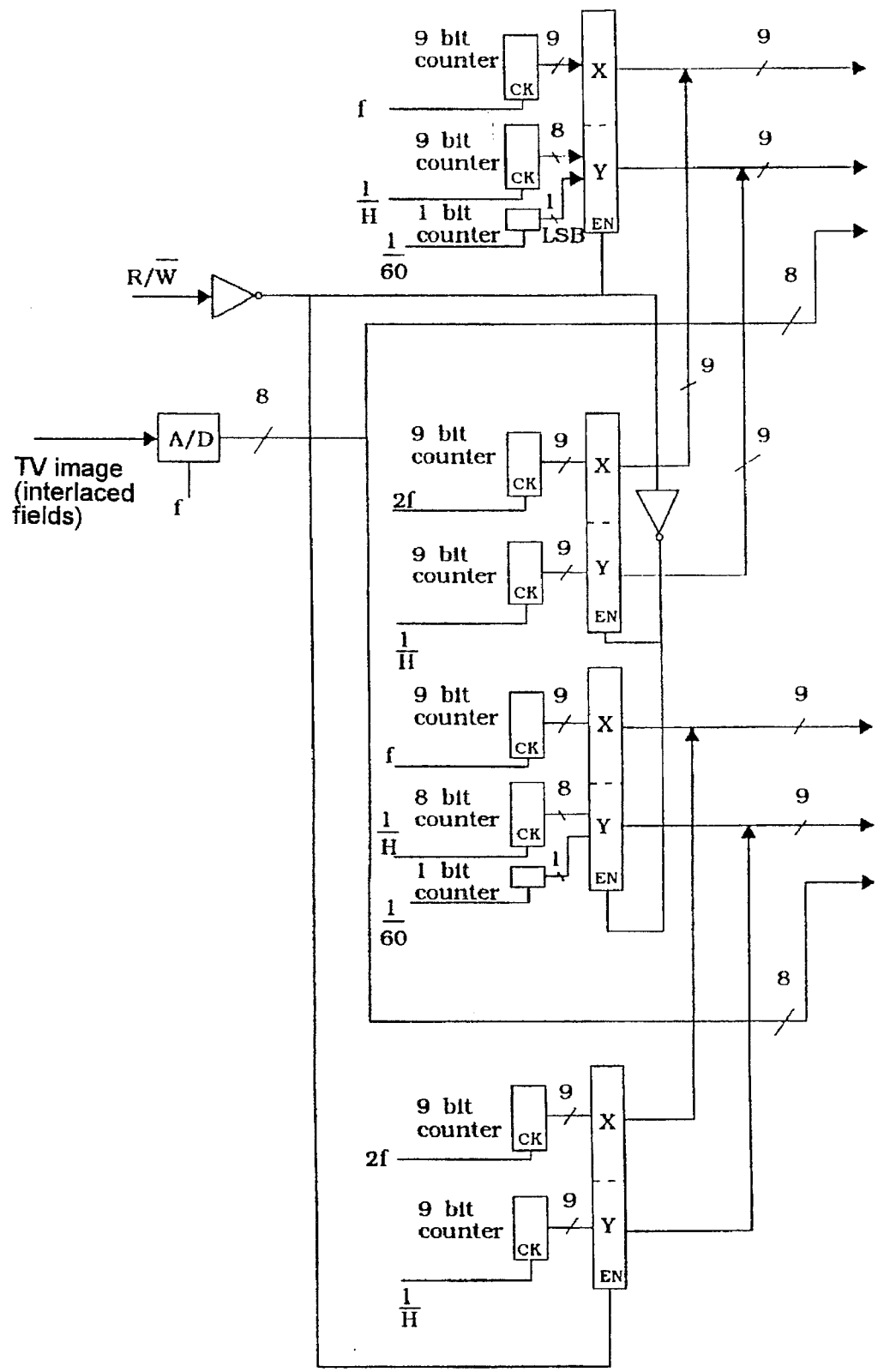
FIG. 6 is an improved design to the circuit of FIG. 5.

The above design simulates the method of linear interpolation by replication followed by a 2-D square symmetrical low-pass filter. The circuit shown in FIG. 6 represents an equivalent to FIG. 5 but requiring less hardware. The circuit operates similar to that of FIG. 5 described above. The memory arrays 610 and 612 can be each reduced to 512×512 bytes, and the replication step can be simulated by incrementing the X-address counter by a clock frequency of 2 f and the Y-address counter by 1/H during the reading cycles. Since the 2-D filter 620 runs at a clock frequency (throughput) of 4 f it 'sees' each pixel twice and each line twice.

Note that although the design has been presented for doubling the image resolution to 1024×1024 pixels from 512×512 pixels, it requires only slight modifications in order to accommodate the 700×525 pixels in the NTSC standard. These modifications would include changing the sampling frequency to f=700/H, and the size of each of the memory arrays to 700×525 bytes. The invention also applies to any television transmission standard, such as the PAL or SECAM systems.

A sharper image is obtained if a 2-D circular symmetrical high-pass filter follows the 2-D square symmetrical LPF. It was found that an FIR filter made to approximate a Butterworth function with a cut-off frequency $\omega_c \sim 1$ rad./sec. if used provides a good quality image of the higher resolution picture. The coefficients of a 5×5 FIR filter having such characteristics is given in Table II.

TABLE II

Coefficient of high-pass FIR filter for image enhancement after resolution doubling.

| | | | | |
|---|---|---|---|---|
| −0.009385 | −0.015012 | −0.017516 | −0.015012 | −0.009385 |
| −0.015012 | −0.032653 | −0.050470 | −0.032653 | −0.015012 |
| −0.017516 | −0.050470 | 0.887192 | −0.050470 | −0.017516 |
| −0.015012 | −0.032653 | −0.050470 | −0.032653 | −0.015012 |
| −0.009385 | −0.015012 | −0.017516 | −0.015012 | −0.009385 |

Having doubled resolution, the resulting images must be displayed in real-time. Since the output of the 2-D low-pass filter is being produced at the rate of 30 frames per second, displaying images directly would result in severe flicker. Sixty frames per second are needed to overcome flicker, which may be accomplished using one of the following two techniques:

1. Use progressive scanning, i.e. no interlace, and display each image twice, once every 1/60th of a second.
2. Use interlaced scanning by displaying ½ of each image (odd lines only) in 1/60th and the other ½ (even lines only) in the remaining 1/60th of a second. Each ½ image is usually referred to as a field. A ½ image consisting of even lines is called an even field, and the other ½ image consisting of odd lines is called the odd field.

Either approach requires two memory arrays of size 1024×1024 bytes. In one memory array the incoming image is written, while reading the previous image from the other memory array. Reading of the memory array determines the method of scanning on the screen. Progressive scanning provides less flicker than interlaced scanning and is expected to dominate future television designs.

Figure 7A:
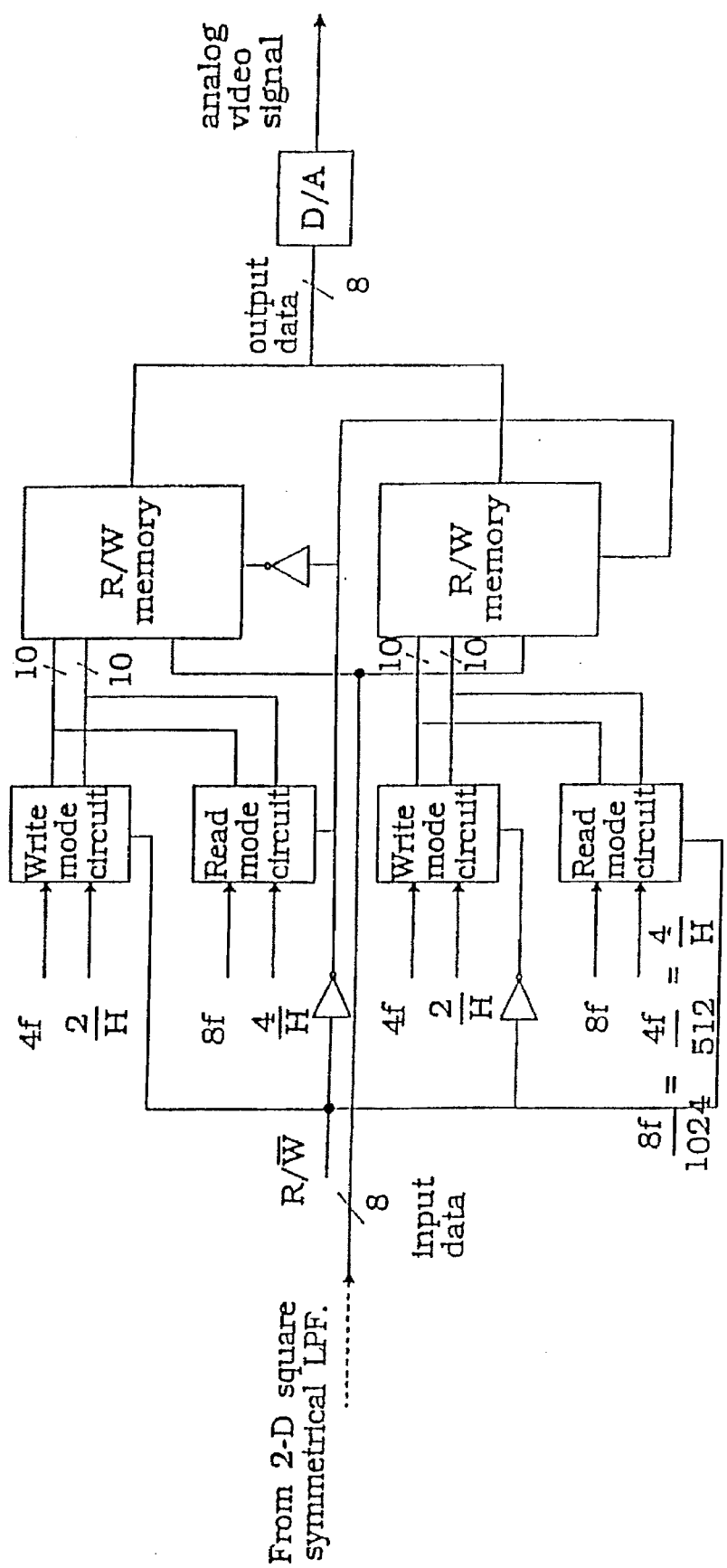
FIG. 7a is a circuit for displaying a higher resolution image with input clock frequencies for progressive scanning.
Figure 7C:
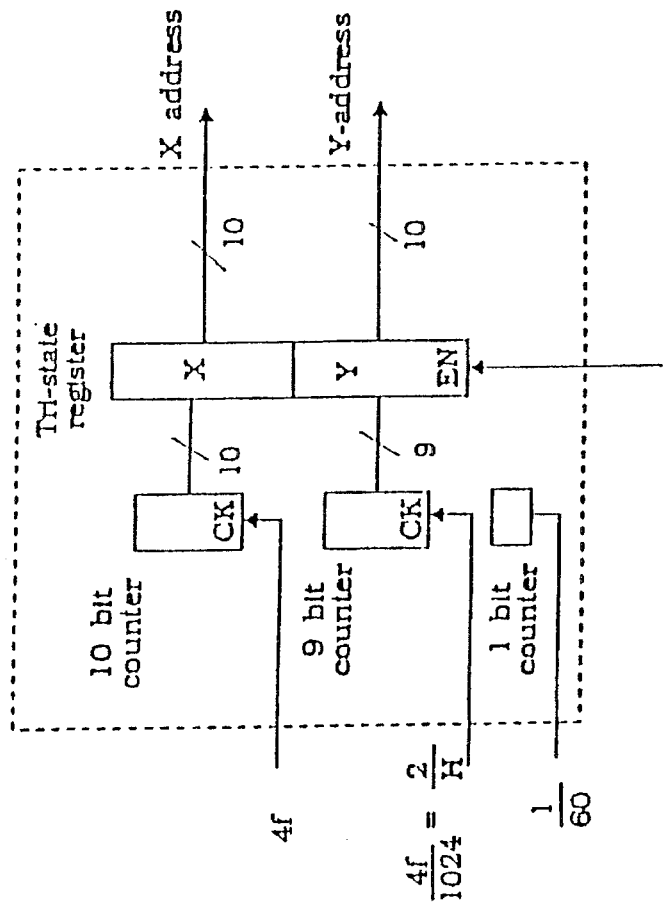
FIG. 7c shows an address generation circuit useful with interlaced scanning.
Figure 7B:
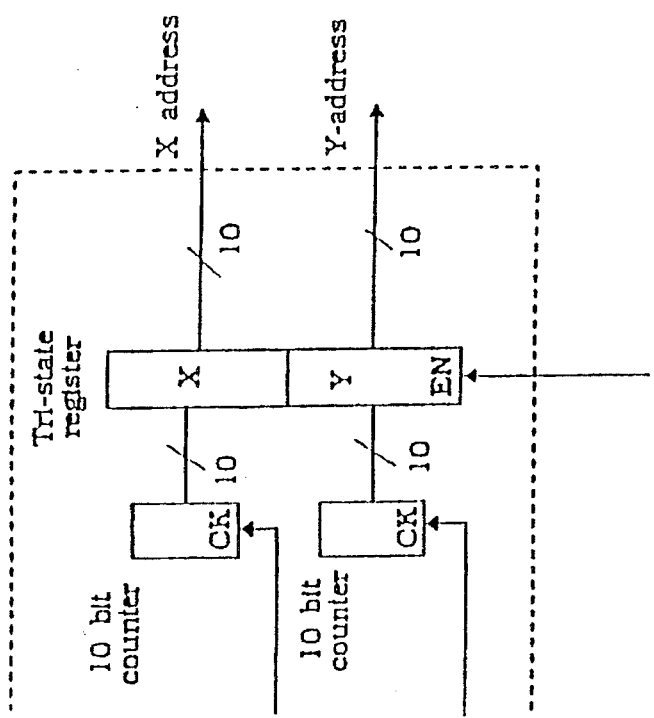
FIG. 7b shows an address generation circuit useful with progressive scanning.

FIG. 7a shows the arrangement for displaying the image along with the design for the read or write mode circuits (FIG. 7b). The design of the read mode circuit is identical to the write mode circuit for progressive scanning with the exception that they are driven by clocks of different frequencies. The write mode circuit is driven by 4 f for the counter addressing the X-address lines of the R/W memory and 2/H for the counter addressing the Y-address lines, and the read mode circuit is driven by 8 f and 4/H for the X and Y counters, respectively. The read mode circuit for interlaced scanning is shown in FIG. 7c, which also shows the frequency clocks needed to drive the circuit.

Figure 8:
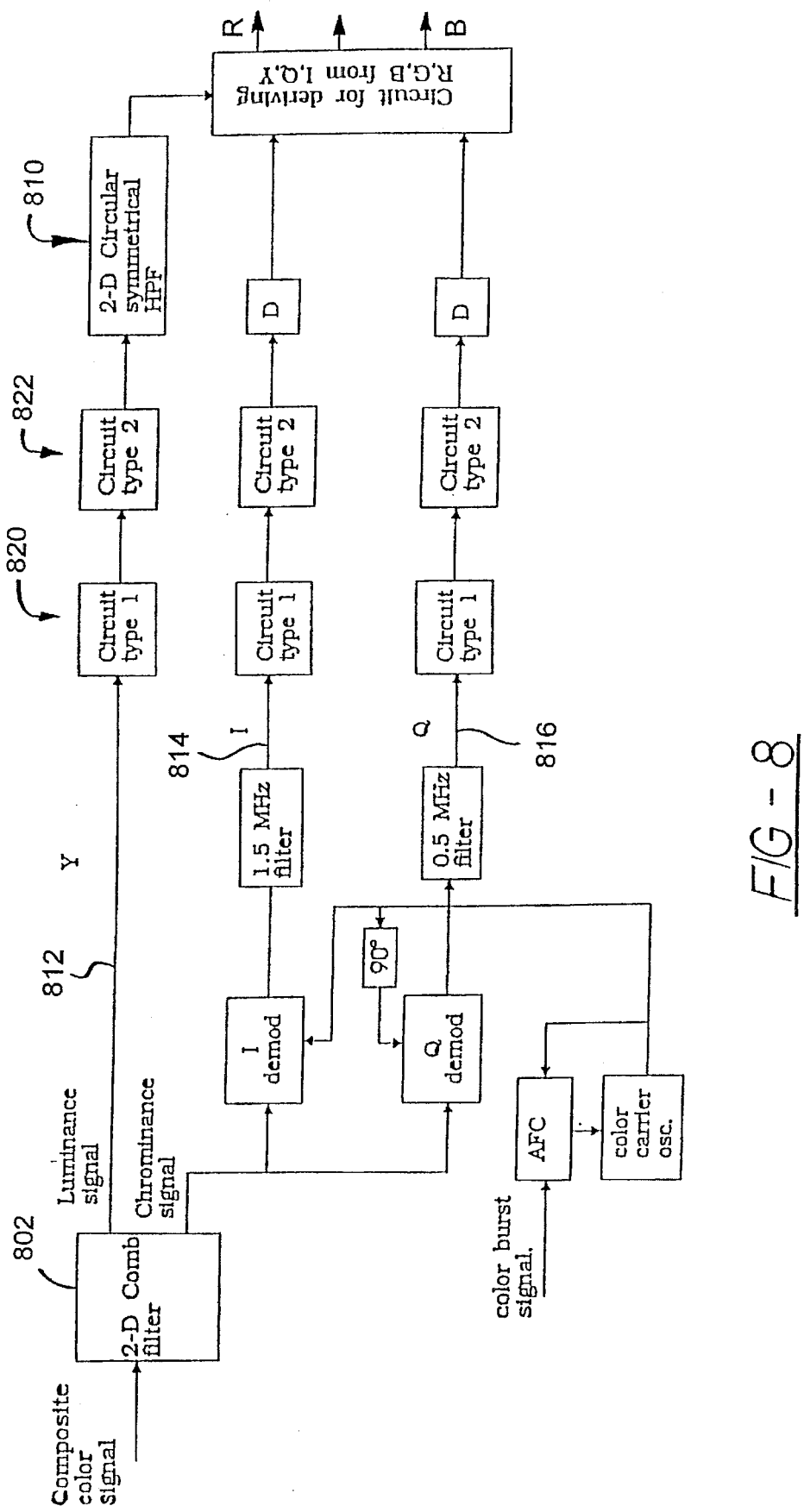
FIG. 8 is a block diagram of an improved NTSC circuit.

FIG. 8 shows the changes needed in an NTSC television receiver to provide IDTV or, in this case, improved NTSC. A 2-D high-pass filter 810 for enhancement of the higher definition image is placed only in the line carrying the luminance signal. The design utilizes the structure derived from the Sampling theorem, i.e. replication followed by a square symmetrical LPF to double the resolution of the image, and is applied to Y, I and Q lines 812, 814 and 816, respectively. The circuit type 1 shown in FIG. 8 820 is the circuit of FIG. 6, and the circuit type 2 822 is that of FIG. 7. The delay circuits "D" exhibit a latency time equal to the latency time of the 2-D circular symmetrical high-pass filter placed in the Y line 812. A 2-D comb filter 802 can be used but is not necessary for this design to work. The rest of the circuit represents a standard US NTSC system.

Figure 9:
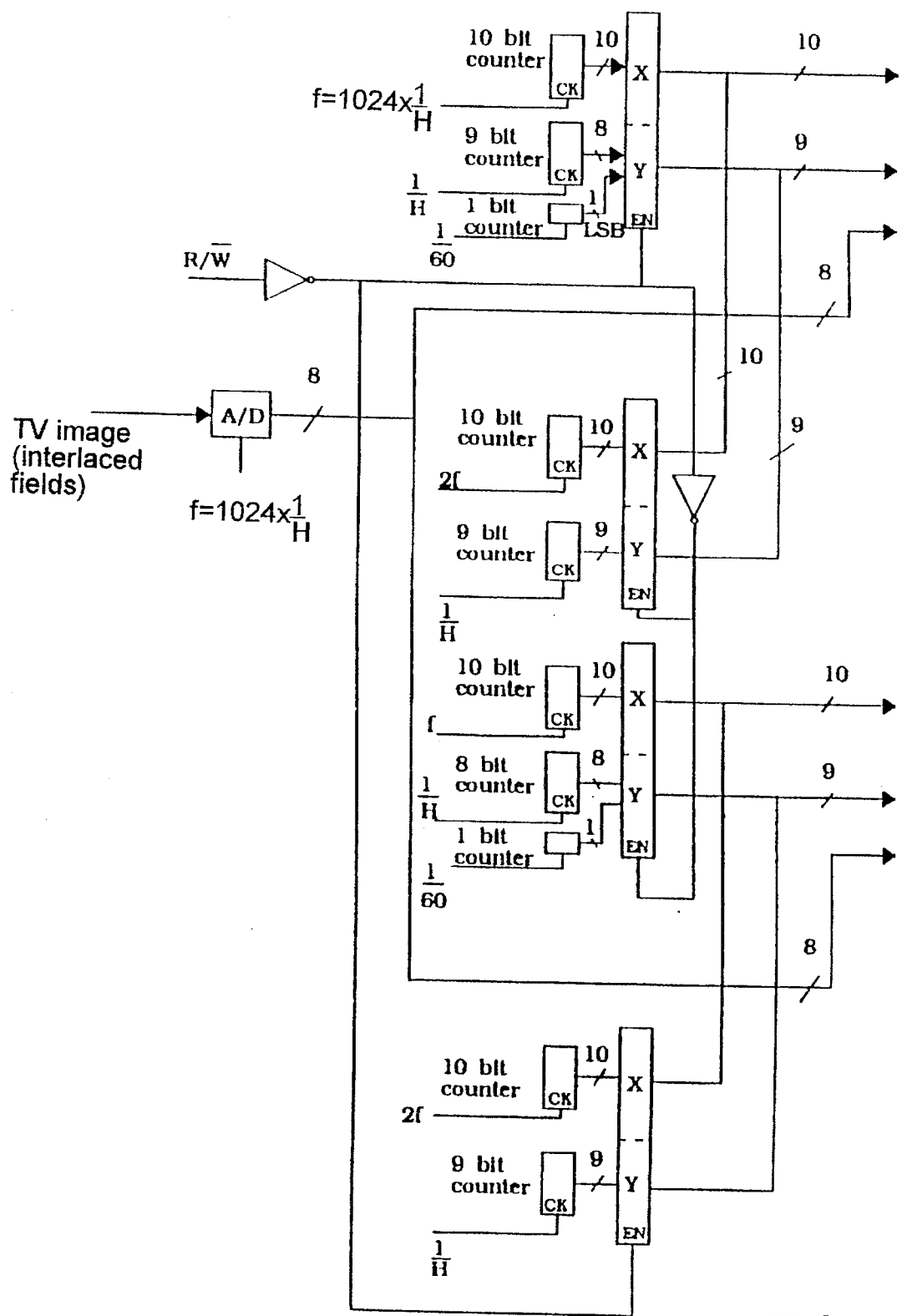
FIG. 9 illustrates interpolation by over-sampling a horizontal line and the utility of a 1-D low-pass filter designed with line delays instead of pixel delays.

An alternative approach to resolution doubling is to oversample each line to 1024 pixels and double the number of lines through interpolation. This would require the use of a 1-D low-pass filter (LPF) running at twice the sampling frequency. Such a realization is shown in FIG. 9. The delays in the 1-D digital filter 920 represent line delays and not pixel delays. This approach makes use of the Sampling Theorem just as the two-dimensional approach in which a 2-D square symmetrical LPF is used. The desired characteristic 922 of the 1-D filter is also shown in FIG. 9. This filter can be designed as a 1-D recursive filter using known methods. Alternatively, one can replace in the 2-D transfer function given above and whose coefficients are given in Table I, $z_1-1$ and $z_2=z$, to obtain the 1-D transfer function whose characteristic will be similar to the 2-D transfer function along the $\omega_2$ axis (with $\omega_1=0.0$).

From the concepts presented it should be noted that one can extend the process to obtain a resolution of 2048×2048, and so on. The limit is set by the technology and the Sampling Theorem. With this concept it should also be possible to achieve a "super" EDTV receiver which will have more number of lines than HDTV. To implement this concept fast memory is required. DRAMS are commercially available with speeds of 250 Mhz which will allow a quadrupling the of resolution of the incoming image.

Figure 10A:
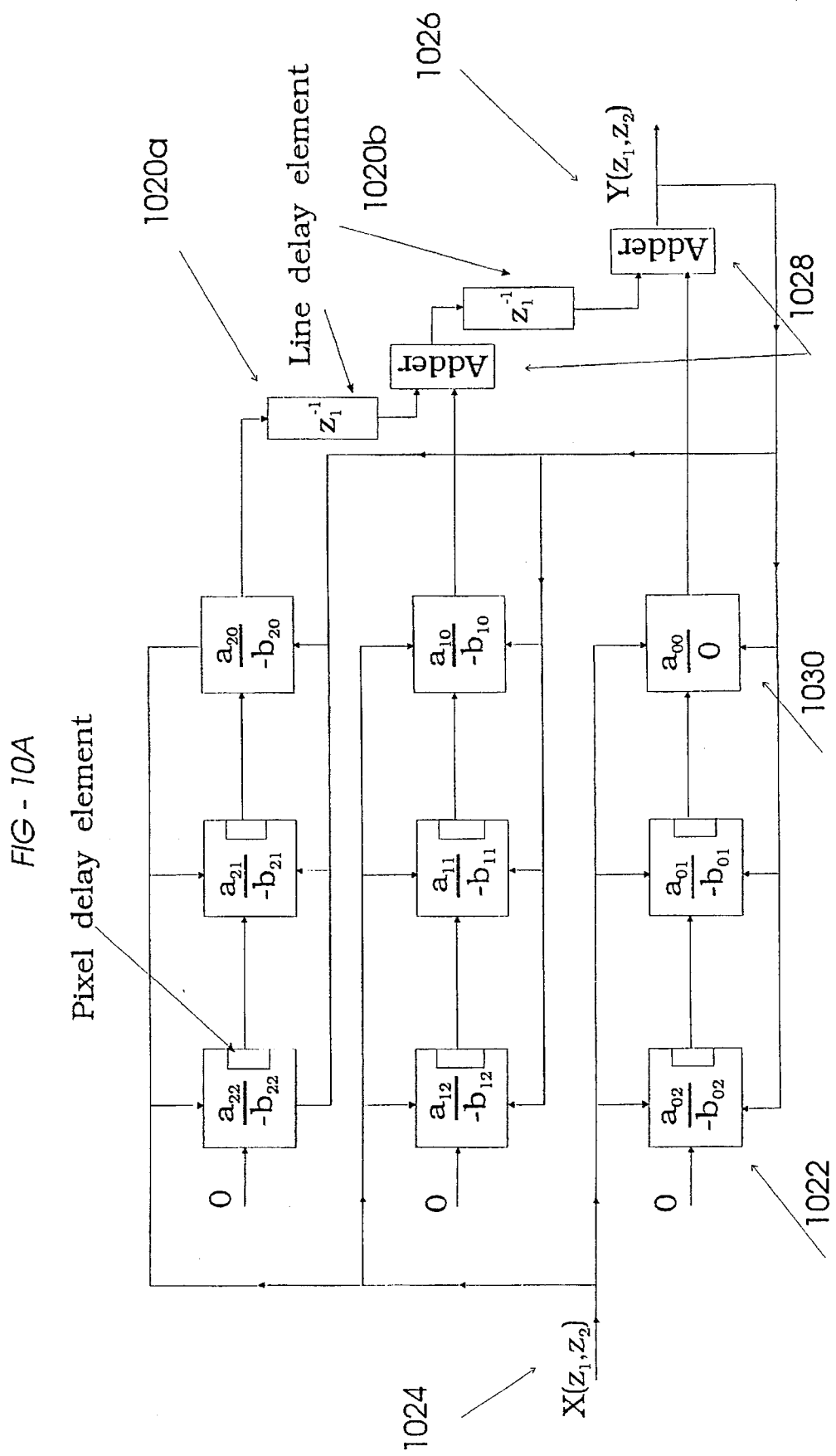
FIG. 10a is a semi-systolic realization of a 2×2 FIR digital filter.
Figure 10B:
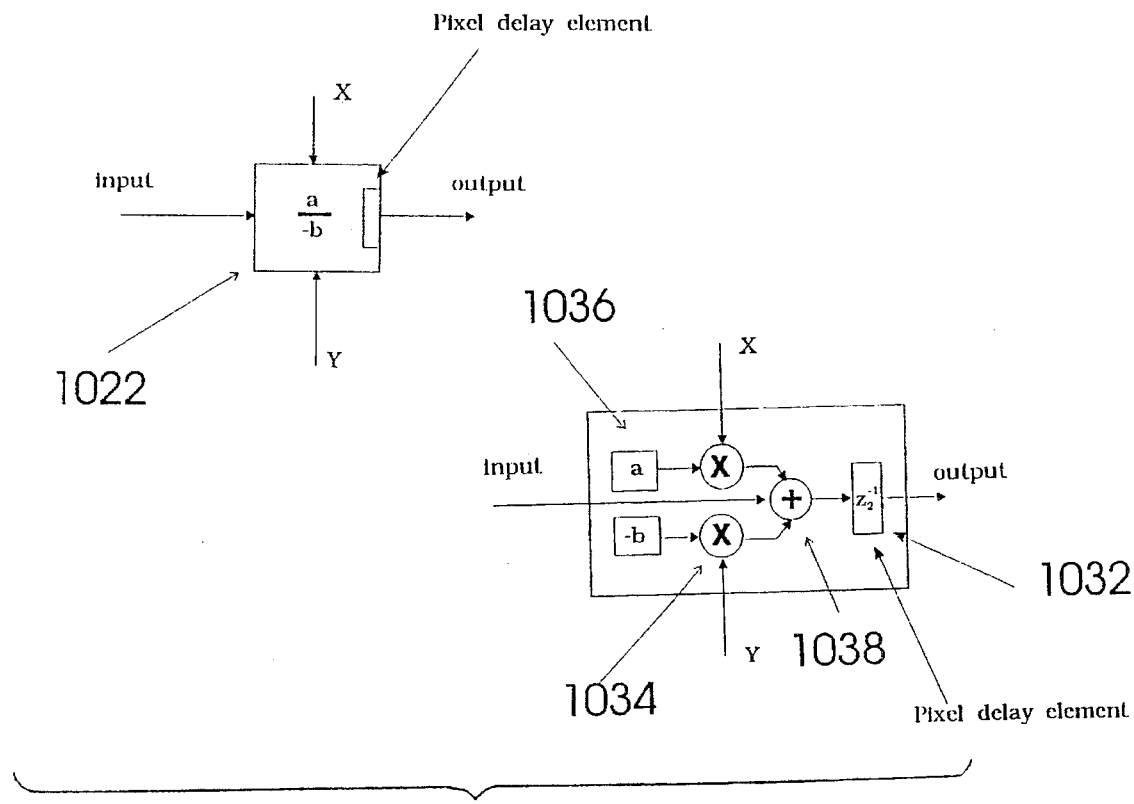
FIG. 10b is a design of a processing element having an output latch.
Figure 10C:
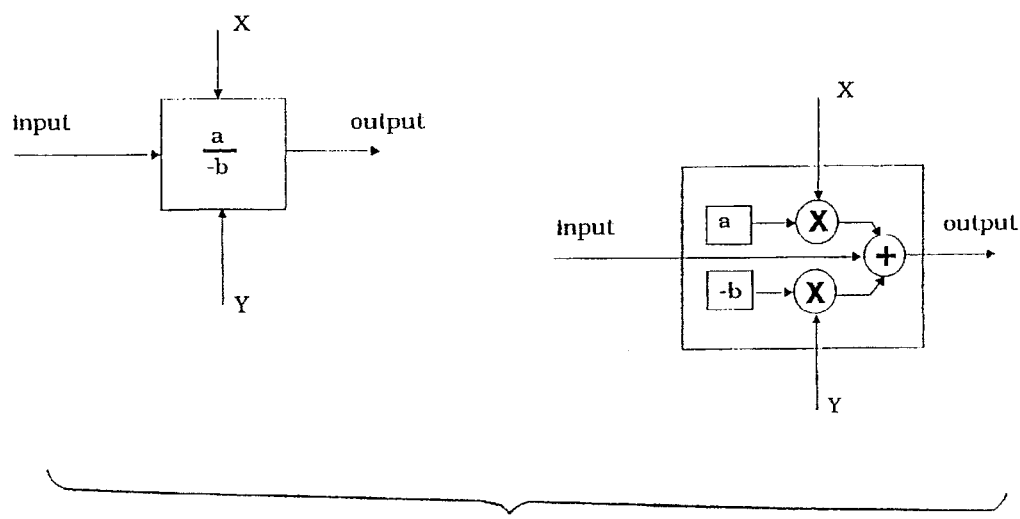
FIG. 10c is a design of a processing element without an output latch.
Figure 11A:
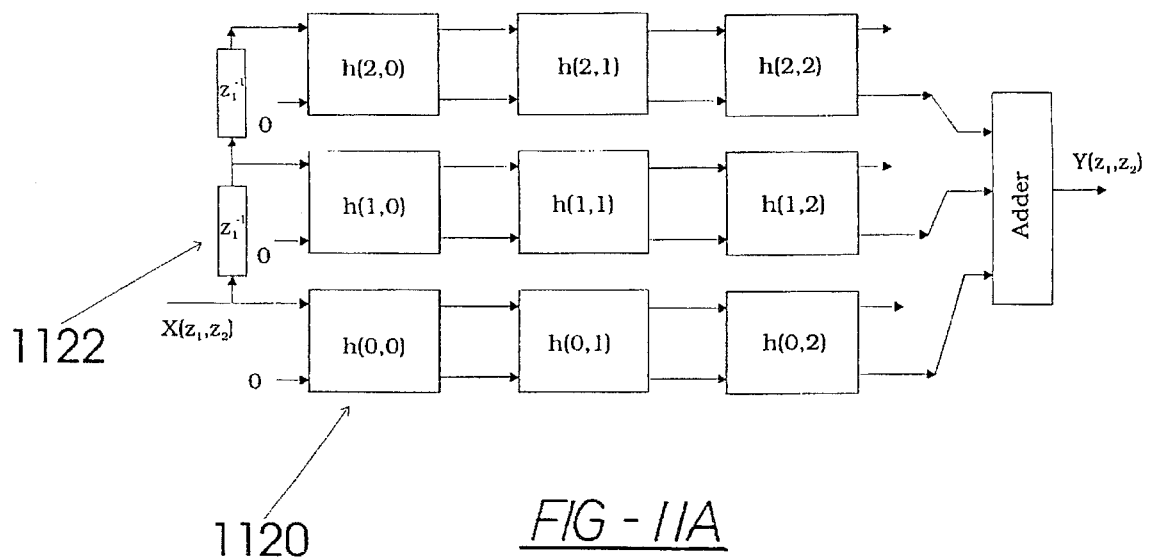
FIG. 11a is a pipelined systolic realization of a 2×2 FIR digital filter.
Figure 11B:
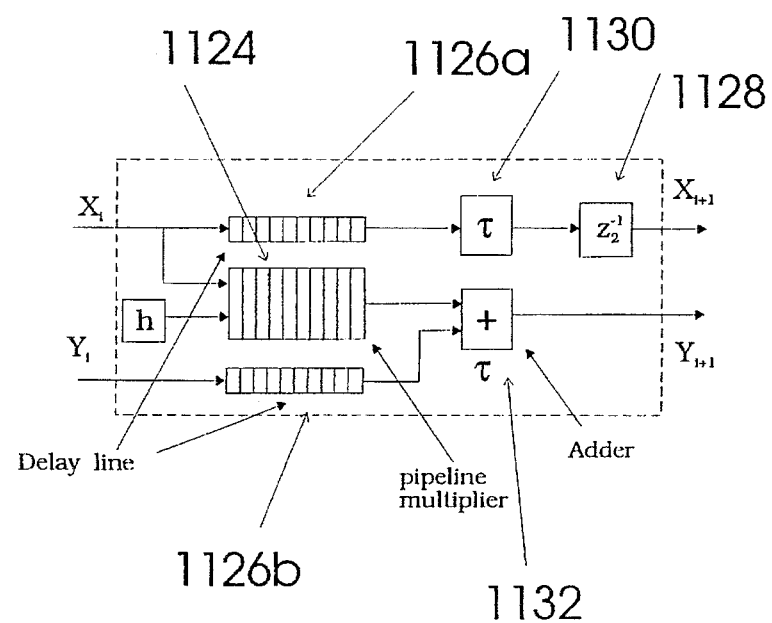

The 2-D filter can be implemented in hardware using digital or analog components. The analog design can be carried-out using the sample-and-hold architecture described, for example, in "A Sample and-Hold Semi-Systolic Realization For 2-D Recursive Digital Filters," by M. A. Sid-Ahmed in the International Journal of Electronics, vol. 73, (1992), No. 3, pp.633–646, and in "Real-time 2-D homomorphic filter for broadcast TV signals" by H. J. Kaufman and M. A. Sid-Ahmed in IEEE Transactions on Consumer Electronics, Vol. 38, No. 2, May 1992, pp.48–56. The low-pass filter can be either a finite impulse response type, FIR, or IIR (infinite impulse response type. One can also use higher order interpolation arrays or low-pass filters for interpolation. These are usually then followed by 2-D high-pass filters. A possible semi-systolic realization of the IIR filter is shown in FIG. 10a. The processing elements (PE) for the filter are shown in FIG. 10b and FIG. 10c. Realization of an FIR filter as a true pipelined systolic array is shown in FIG. 11a. The design of the PE is shown in FIG. 11b. The realization is for a 2×2 FIR filter, which can be extended to any order.

Figure 12:
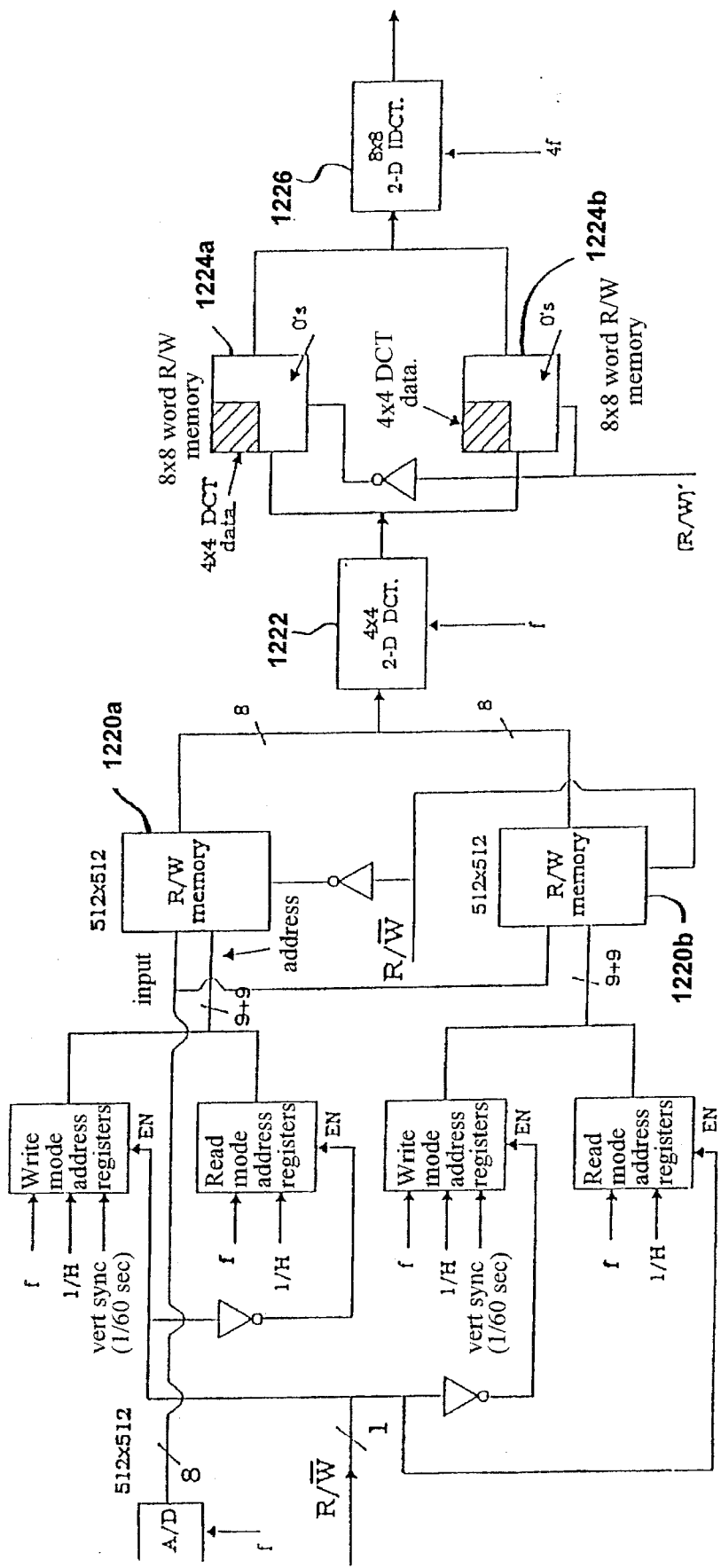
FIG. 12 shows how the discrete cosine transform (DCT) may be used to double image resolution.
Figure 13:
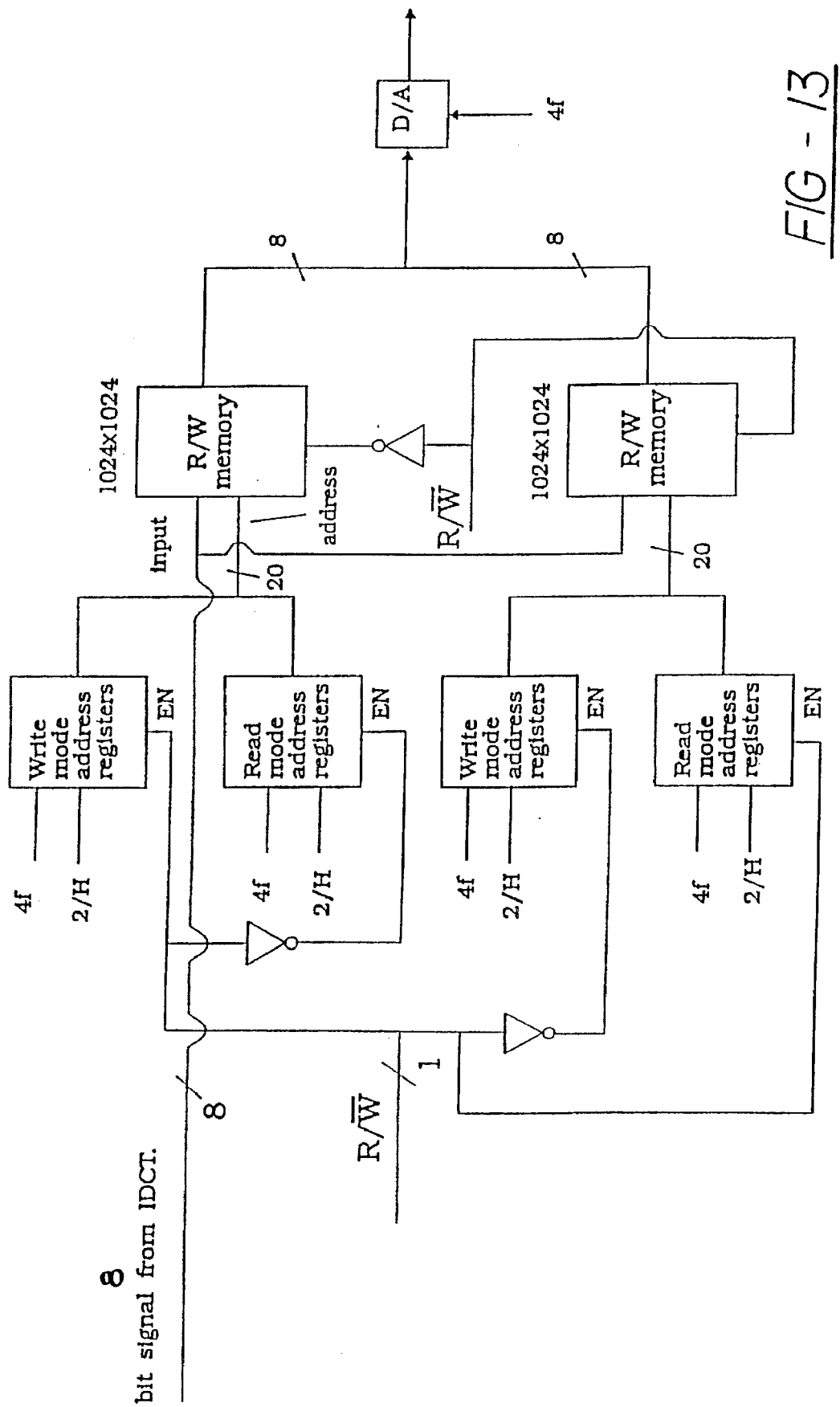
FIG. 13 is a display circuit for the DCT approach of FIG. 12.

The designs previously described utilize filters for interpolation. An alternative approach is to use a transformation such as the Discrete Cosine Transform (DCT) and append enough zeros to double the resolution. Such a design is shown in FIG. 12. The hardware operates as follows: Data is read from the read enabled 512×512 R/W memory 1220 in 4×4 blocks, for example and sent to a 4×4 2-D DCT circuit 1222. The results are stored in a write enabled 8×8 word R/W memory 1224 at the top left 4×4 locations with 0's zeros stored at the rest of the locations. Two such memory arrays are required to allow the continuous flow of data as explained previously. The results are read from the read enabled 8×8 word R/W memory to a 2-D inverse Discrete Cosine (IDCT) circuit 1226, and stored in a write enabled 1024×1024 byte R/W memory of the output stage shown in FIG. 13 at the appropriate positions. The video signal is obtained from the read enabled 1024×1024 byte memory and transformed to analog form using an D/A converter.

Although the circuits presented are for line doubling they can also be used for selective zooming of TV images at the frame rate, which is 30 frames/sec. or 60 fields/sec.

It is intended that the scope of the invention be limited not by this detailed description, but rather by the claims appended hereto, nor should it be construed that the invention is limited to the NTSC standard but is to be understood that it is applicable to any television transmission standard.

The foregoing description of the preferred embodiment and alternatives have been presented for the purpose of illustration and description. It is not intended to be exhaustive or to limit the invention to the precise forms disclosed. Many modifications and variations are possible in light of the above teachings. It is intended that the scope of the invention be limited not by this detailed description, but rather by the claims appended hereto.

I claim:

1. A method of expanding the number of pixels used to display a video image, comprising the steps of:

receiving pixels associated with an incoming digitized video image;

replicating each pixel;

low-pass filtering the replicated pixels in two dimensions using a square symmetrical filter to provide interpolated values;

converting the interpolated values into analog form; and displaying the converted pixels at the same frame rate as that associated with the incoming digitized video image.

2. The method of claim 1, further including the step of high-pass filtering the low-pass-filtered pixels to enhance their sharpness.

3. A system for multiplying the number of pixels associated with a digitized video image, comprising:

a source of a digitized video image having alternating fields;

two read/write memories in communication with a common output bus;

write-mode circuitry operative to enable the memories so that each is written with data representative of an alternating field of the image;

read-mode circuitry operative to output the data onto the common bus, the read-mode circuitry operating at a frequency higher than that at which the pixels were written to memory, thereby expanding the number of pixels along each row and between consecutive rows;

low-pass filtering means operative to filter the expanded pixels symmetrically in two dimensions to produce interpolated values; and a digital-to-analog converter to convert the digitally filtered, interpolated values into analog form for subsequent display.

4. The system of claim 3 wherein the digital filtering means includes a square-response-type low-pass filter.

5. The system of claim 3 wherein the digital filtering means includes two one-dimensional filters.

6. The system of claim 3 further including:

a second pair of read/write memories in communication with a second common output bus, each memory having a capacity sufficient to store data representative of the expanded pixels associated with both fields of the image; and read-mode circuitry operative to address the second pair of read/write memories so that while one of the memories is being written, the other may be read out to the digital-to-analog converter over the second bus.

7. The system of claim 6 wherein the read/write memory being read out is done so on a progressive scan basis.

8. The system of claim 6 wherein the read/write memory being read out is done so on an interlaced scan basis.

* * * * *